United States Patent
Holtkamp

[15] 3,680,021
[45] July 25, 1972

[54] OVEN THERMOSTAT FOR HEAT CLEANING OVEN

[72] Inventor: Calvin J. Holtkamp, Mansfield, Ohio
[73] Assignee: Westinghouse Electric Corporation, Pittsburgh, Pa.
[22] Filed: Dec. 31, 1970
[21] Appl. No.: 103,097

[52] U.S. Cl..............................337/312, 219/393, 337/311, 337/374
[51] Int. Cl......................................................H01h 37/12
[58] Field of Search..................337/115, 312, 313, 319, 311, 337/374, 323, 330; 219/489, 393, 396, 398, 412, 413

[56] References Cited

UNITED STATES PATENTS

| | | |
|---|---|---|
| 2,273,375 | 2/1942 | Ray....................................337/374 X |
| 2,671,837 | 3/1954 | Ray....................................337/374 X |
| 2,413,100 | 12/1946 | Crise..................................337/374 X |

Primary Examiner—Bernard A. Gilheany
Assistant Examiner—F. E. Bell
Attorney—F. H. Henson and E. C. Arenz

[57] ABSTRACT

An oven thermostat for a heat cleaning oven is provided in which a concentric shaft arrangement controls positioning of a movable member which establishes the temperature at which cycling of the switch contacts of the thermostat will take place to correspondingly cycle heating means in the oven, the inner shaft of the arrangement being used to establish the temperature in the cooking temperature range and the outer shaft being used to set the heat cleaning temperature.

9 Claims, 6 Drawing Figures

INVENTOR
Calvin J. Holtkamp

OVEN THERMOSTAT FOR HEAT CLEANING OVEN

CROSS REFERENCE TO RELATED PATENT APPLICATIONS

My copending U.S. Patent application Ser. No. 103,098 filed Dec. 31, 1970 is considered to be a related patent application.

BACKGROUND OF THE INVENTION

1. Field Of The Invention

The invention pertains to the art of temperature control of heat cleaning ovens.

2. Description of the Prior Art

It is conventional to provide, in an oven control system for the ordinary cooking oven which does not accommodate a high temperature heat cleaning operation, a hydraulic oven control including two basic parts; an adjustable thermostatically controlled switch mechanism and a circuit selector switch, both controlled by a common shaft. In addition to an optional OFF position, bake circuitry is automatically set up throughout the adjustable bake temperature range, and broil circuitry is automatically set up at the highest temperature point. The adjustable thermostatically controlled switch mechanism includes a snap-acting, over-center mechanism for operating the cycling switch contacts. This over-center mechanism is operated in turn by a hydraulically filled oven sensor bulb connected to the thermostat by a capillary tube and terminating in a wafer providing mechanical movement in the thermostat in accordance with expansion and contraction of the fluid. The oven temperature is set by rotating the dial shaft, which is threaded through a bushing, and which positions the over-center mechanism at the proper position. The circuit selector switch consists of conventional cam-operated spring blades which cooperate with mating contact terminals. The temperature limit of the control is determined by the fluid used in the hydraulic bulb capillary tube and wafer. Chlorinated diphenol fluid has typically been used in controls that are designed for non-self-clean ovens, while liquid mercury, or alternatively, a sodium potassium alloy, has been used for sensing in high temperature self-clean ovens. In the latter case however, the expansion of the fluid has typically been used to open and close a switch independent of the main oven thermostat. In the non-self-clean ovens, the thread pitch on the shaft is matched to the expansion characteristics of the fluid used so that the usable temperature zone is dispersed over a suitable dial angle, which is generally as extensive as possible for temperature setting repeatability.

One typical dial layout for a hydraulic control used only for bake and broil functions, on either type of oven, uses 335 angular degrees of dial rotation to cover the usual 460 temperature degree spread required (140° to 600° F), and uses 25 angular degrees for the rotational shaft stop. The 335 angular degrees is divided as follows: 265 angular degrees for the bake zone (140° to 525° F) and 70 angular degrees for the space required to obtain the approximate 600° F broil temperature position. The single dial version of this control which contains circuit selecting switches is designed to have an off position in the 70 angular degree zone between bake and broil. U.S. Pat. No. 2,935,591 generally illustrates the functional components of an oven control of the type just described for a non-self-clean oven.

If the control is attempted to be modified for use over a 900° F temperature spread (140° to 1,040° F) through selection of the proper shaft thread, it is apparent that the bake and broil zones will be compressed approximately 50 percent and the substantially non-useful zone between 600° F and 1,040° F will be excessively wide and generally unsatisfactory.

Reference should be had to the noted companion patent application for a description of a prior art oven control thermostat which uses a single shaft and also solves the problem of sufficient angular space for the cooking temperature settings, but which is deficient in my view in several other respects.

An aim of my invention is to provide an oven control thermostat system which in large part utilizes the standard oven control, and which avoids at least some of the disadvantages of the noted single dial oven control currently on the market.

SUMMARY OF THE INVENTION

In accordance with the invention there is provided an oven thermostat of the type having a snap-acting, over-center mechanism for operating the switch contact means and in which axial movement of the movable member for setting the operating point of the over-center mechanism is provided by operation of a user rotatable shaft arrangement which positions the movable member for either a range of oven temperatures for cooking operations, or a single high temperature setting for a heat cleaning operation, and in which the shaft arrangement includes inner and outer rotatable and axially movable concentric shafts, with the inner shaft being threadably carried by the outer shaft and the outer shaft being threadably carried by the thermostat casing, with the inner shaft having a thread lead to effect axial movement of the movable member in accordance with rotation of the inner shaft for a distance corresponding to the cooking temperature range, and with the outer shaft having a thread lead to effect axial movement of the movable member through the medium of the inner shaft for a total distance encompassing all of the cooking temperature range plus an additional temperature increase to a temperature corresponding to the desired heat cleaning temperature.

DRAWING DESCRIPTION

BRIEF DESCRIPTION OF THE PREFERRED EMBODIMENT

Figure 1:
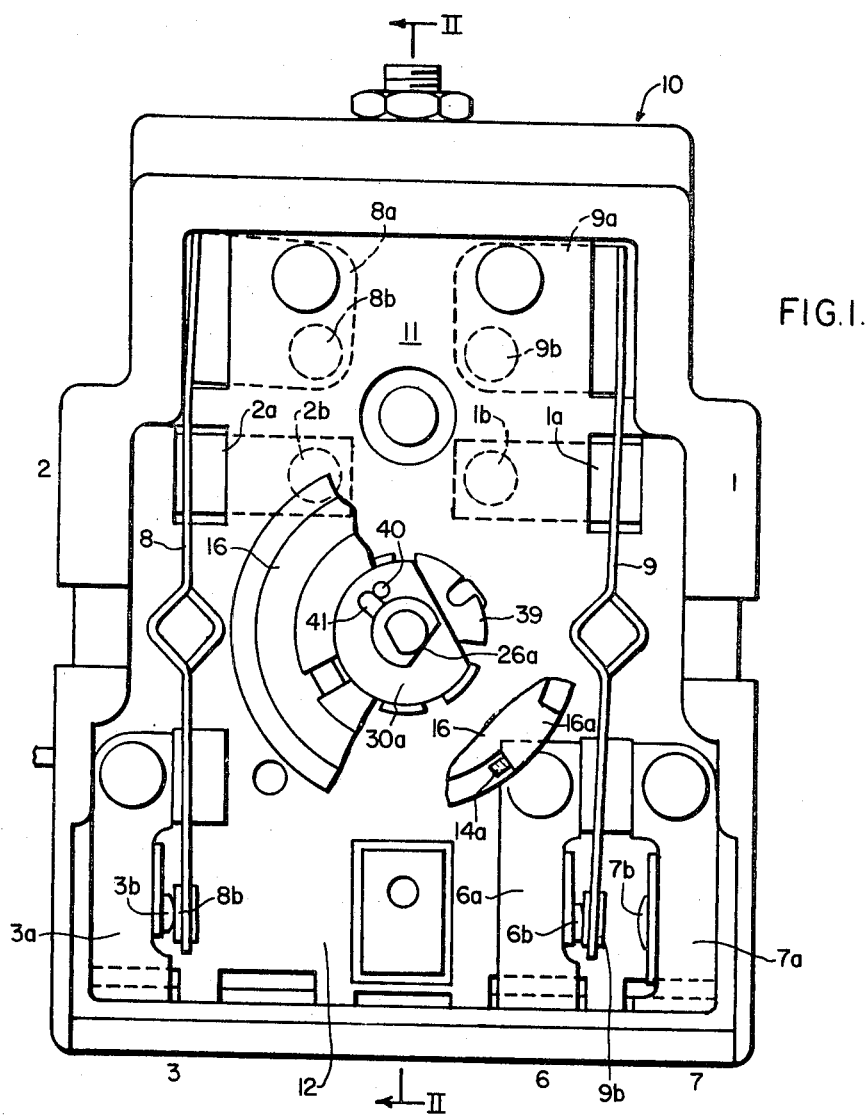
FIG. 1 is a partly broken face view of a thermostatic oven control according to the invention with the cover and some other parts omitted.
Figure 2:
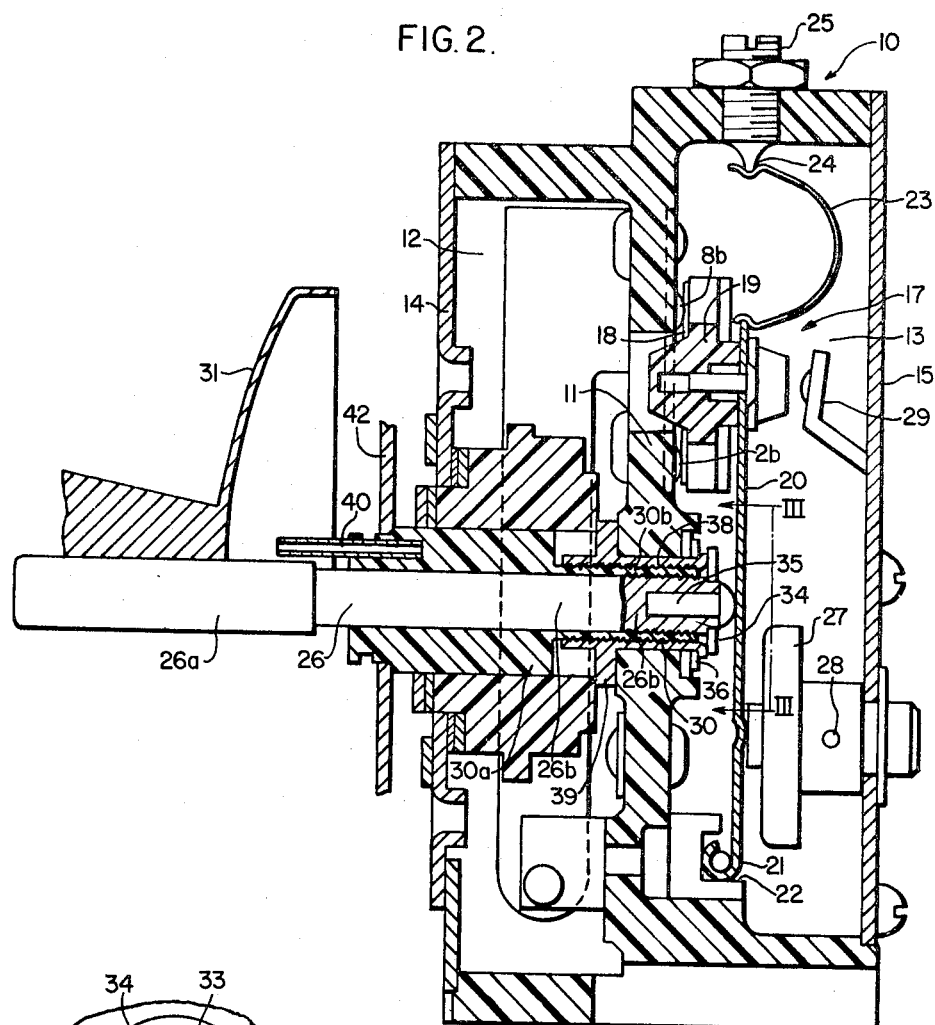
FIG. 2 is a vertical section corresponding to one taken along the line II—II of FIG. 1 but with the front cover in place and part of the operating mode dial and temperature adjusting dial shown in part.

A thermostat assembly for use in a control system according to the invention is shown in generally assembled form in FIGS. 1 and 2. The thermostat casing 10 is a molded plastic, generally box-shaped member with an intermediate wall 11 separating the interior into opposite, outwardly open front and rear chambers 12 and 13, with front and rear removable covers 14 and 15 being provided for the open faces of the chambers. The front chamber 12 basically contains the circuit switching arms and contacts and the operable mechanism for setting the thermostat, while the rear chamber 13 basically contains the over-center mechanism, the cycling switch means and associated parts which control its operation.

While the contact terminals on the exterior of the thermostat by which the thermostat is connected into the circuits in which its functions are visible only from the rear of the thermostat, the corresponding location of these terminals as viewed from the front and as identified as 2–3 and 1–6–7, is shown in FIG. 1 to aid in relating the location of these contacts. The electrically conductive strips which terminate in the exterior terminals are riveted to the casing intermediate wall 11 and are given the same numeral as the exterior terminal with a suffix letter *a* to indicate the electrically common connection. The switch contact portions of each terminal and strip also carry the same numeral with a suffix *b*.

Contact spring arms 8 and 9 are located in the front chamber 12. Spring arm 8 is anchored at its upper end and carries a movable contact 8*b* at its lower end. Spring arm 9 is also anchored at its upper end and carries contact 9*b* at its lower end. Appropriate lobes on the cam generally designated 16 moves the spring arms 8 and 9 in accordance with rotation of the cam 16 so that contact 8*b* is moved into or out of engagement with contact 3*b*, and contact 9*b* is movable into and out of engagement with either of contacts 6*b* and 7*b* in accordance with whether the operation is to be cooking or cleaning. The fixed upper ends of the spring arms 8 and 9 extend through slots in the intermediate wall 11 and have portions 8*a* and 9*a* extending along the rear base and riveted to the intermediate wall 11. Additional contacts 8*c* and 9*c* are provided on these riveted portions.

Figure 3:
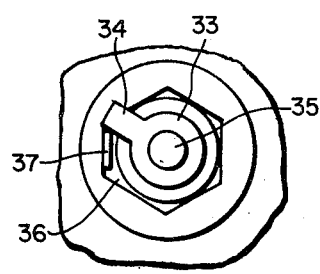
FIG. 3 is a face view of the inner end of the temperature adjusting shaft, this view corresponding to one taken along the line III—III of FIG. 2.

Referring now to FIGS. 2 and 3, the cycling switch arrangement generally designated 17 includes a pair of electrically conductive bridging strips 18 (only one as seen in FIG. 2) carried in spaced-apart, electrically insulated relation by the plastic carrier 19 upon which they are secured in loosely held relation to accommodate proper seating upon the contacts. When the cycling switch is closed, the one strip bridges from contact 2*b* (FIG. 2) to 8*b*, while the other bridges from 1*b* to 9*b*. The carrier 19 is attached to a spring arm 20 which has a lower T-shaped end 21 which seats in a niche 22 formed in the casing material. The upper end of the arm 20 is received in an indent at one end of the curved over-center spring 23 which has a dimple 24 at its opposite end seating on the point of an adjusting screw 25 turned into the top wall of the casing 10. The arm 20 is fulcrumed at one location against the end of movable shaft 26. A pressure wafer 27 connected by capillary tube 28 to an oven temperature sensitive bulb (not shown) bears against the spring arm 20 at a location between the inner end of shaft 26 and the lower T-shaped end 21.

The general way in which the cycling switch 17 works is as follows as viewed in FIG. 2. With an increase in oven temperature the pressure wafer 27 exerts a correspondingly increasing force to the left on arm 20 at the bearing location. When the force and lever arm product provided by the pressure wafer exceeds the force exerted by the over-center spring 23 urging the carrier 17 to the left, the over-center spring 23 snaps the cycling switch carrier 17 to the right until stopped by the inwardly projecting prongs 29 carried by the rear cover 15. Thus, the switch is opened. As the temperature in the oven decreases below a given temperature, the pressure wafer retreats with the slightly bowed spring arm 20 following so that at a given point it will cause the carrier to snap back to close the cycling switch. Thus, it will be appreciated that by moving the shaft 26 in an axial direction, the temperature setting of the thermostat may be changed.

As is also expressed in the noted companion patent application, the general arrangement of the cycling switch with over-center snap action, with its operation being controlled by the relationship between the user operated positionable means comprising the inner end of shaft 26, and the pressure wafer 27, is not new. Nor is it new to provide the circuit selecting arrangement with the spring arms 8 and 9 in the contact terminal arrangement as previously described. In fact, the invention to be described hereinafter is intended to take advantage of this established design of a standard oven thermostat by incorporating modifications and changes therein relating to the manner in which movement of the positionable means, which is the inner end of the shaft 26 bearing against the fulcrum arm 20, is accomplished.

In accordance with the invention, the control thermostat is provided with a concentric shaft arrangement. The inner shaft 26 is used to adjust the cooking temperature desired, while an outer shaft arrangement designated 30 is operated to select the mode of operation, either cooking or cleaning, and also to prevent rotation of the inner shaft when the outer shaft is positioned in the cleaning mode of operation. The inner shaft 26 includes an end 26*a* which projects out beyond the front cover 14 of the thermostat and is D-shaped in cross-section at its outer end to receive in non-rotatable relation a temperature setting dial 31 fragmentarily shown in FIG. 2. The intermediate portion of the length of the inner shaft 26 is circular in cross-section and free to rotate within the enlarged diameter portion 30*a* of the outer shaft, while the inner end portion 26*b* of the inner shaft is exteriorly threaded as at 32 to mate with the internal threads on the smaller diameter portion 30*b* of the outer shaft 30. The inner end portion 26*b* of the inner shaft has a circular disk 33 provided with a radially projecting tab 34 (FIG. 3) fixed to the inner end of the shaft 26 for rotation therewith by the pin 35, the exposed end thereof actually serving as the fulcrum for the contact carrying arm 20. A member 36 which is held in fixed relation to the thermostat casing at the inner end of the shaft 26 is provided with a lug 37 which projects rearwardly and is disposed so that it stops the tab 34 on the inner shaft after rotation in either direction of approximately 300 angular degrees.

Figure 4:
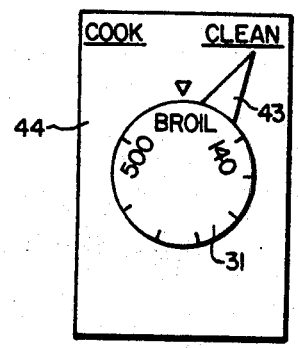
FIG. 4 is a face view of a thermostat with the operating dials assembled, and with the operating mode dial in a clean position.
Figure 5:
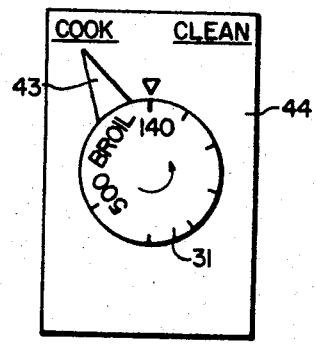
FIG. 5 is a view corresponding to FIG. 4 but with the operating mode dial having been rotated clockwise to a cook position and with the temperature adjusting dial at the lowest temperature setting.

The smaller diameter part 30*b* of the outer shaft 30 has the general shape of a thin wall cylinder provided with interior threads to receive the exterior threads on the inner shaft 26, and exterior threads as at 38 which mesh with interior threads in a bushing 39 held in place by the intermediate wall 11 of the thermostat casing. The larger diameter part 30*a* of the outer shaft is of generally D-shape in cross-section and receives thereon the cam 16 provided with a D-shaped bore so that the cam and outer shaft are rotatable together. The axial outer end of the outer shaft 38 carries an axially projecting pin 40 which rotates with the outer shaft and is used to engage finger 41 which projects radially away from axis of the inner shaft and is fixed to the shaft. A mode selecting dial 42 is seated on the outer shaft adjacent its outer end to drive the outer shaft between its opposite operating positions, the mode selecting dial being provided with an indicating finger 43 (FIGS. 4 and 5).

From the foregoing description it will be appreciated that the inner shaft 26 can be operated throughout about 300 angular degrees by rotating the shaft until the tab 34 (FIG. 3) engages either one side or the other side of the lug 37. The 300 angular degrees provides for corresponding axial movement of the extreme inner end of the shaft so that the temperature may be set in any part of the temperature range between 140° F and 600° F, the upper temperature corresponding the "broil" position on the temperature setting dial 31. However, this 300 angular degree movement of the inner shaft is possible only when the mode selector dial 42 is set at the cook position as is shown in FIG. 5. The reason for this is that when the mode selector is operated from its FIG. 5 position in a counterclockwise direction as indicated by the arrow in FIG. 5 to the FIG. 4 clean position, the pin 40 of the outer shaft drives the finger 41 secured to the inner shaft, and accordingly the inner shaft, before it. Thus in the clean position the pin 40 provides an obstruction to finger 41 and prevents the inner shaft from being operated in a clockwise direction. The inner shaft is also prevented from being operated in a counterclockwise direction by the obstruction afforded to the tab 34 by the lug 37 at the inner end of the inner shaft. In other words, in the clean position of the mode selector, the inner shaft is prevented from being rotated in either direction. However when the mode selector is in the cook position as shown in FIG. 5, the temperature setting dial 31 may be rotated from the illustrated position establishing an oven cycling temperature of 140° F, throughout 300 angular degrees in the direction indicated by the arrow to the position in which the broil portion of the dial lies below the indicating notch on the control escutcheon 44.

The cam 16 (FIGS. 1 and 2) has been noted as being carried on the enlarged D-shaped portion 30*a* of the outer shaft. Accordingly as the outer shaft is rotated by operation of the mode selector 31, the cam 16 also rotates therewith and the appropriate lobes thereon operate the spring arms 8 and 9 to move the contacts 8b and 9b into engagement with the appropriate contacts 3b, 6b and 7b. It is noted that the cam is arranged so that between the cook and clean positions of the mode selector dial, the spring arms are out of engagement with all contacts. As shown in FIG. 1, the cam is also provided on its outer face with an abutment 16a which engages an inwardly directed lug 14a projecting into the front chamber part 12 from the front cover 14. In that connection, it is noted that the parts are shown in FIG. 1 as being in the position they take when the mode selector dial is in its cook position. When the mode selector dial is rotated counterclockwise to the clean position, the other face of the abuttment 16a of the cam engages the lug 14a of the front cover.

As has been noted before, the invention is intended to permit using the general structural arrangement of the standard oven thermostat heretofore used only in connection with non-heat-clean ovens. One aspect of this of course is the use of the cycling switch means of the thermostat itself, connected directly in series with the oven heating elements, to control cycling of the oven heating elements. Establishing the temperature at which the oven heating elements will cycle during baking is accomplished by rotating the temperature setting dial 31 which rotates the inner shaft 26 and accordingly moves the movable member or fulcrum for the arm 20 axially a distance proportional to the rotation of the temperature setting dial. However, full rotation of the temperature setting dial from its position shown in FIG. 5 of 140° F to the broil position corresponding to about 600° F, provides for setting the temperature only within the cooking range. The remainder of the axial movement is accomplished by rotating the mode selector dial 42 between its opposite positions.

The lead on the threads 32 and 38 is selected in accordance with the expansion characteristics of the fluid driving the pressure wafer 27. With the structure shown in the drawings, which incidently is approximately double scale, it has been determined that the movement against the arm 20 by the pressure wafer 27 with either mercury of NAK is such that axial movement of the inner shaft of 0.023 inches gives a temperature range for baking of the required 140° F to 600° F. Fortuitously, the required total movement of the fulcruming movable means (the extreme inner end of the inner shaft 26) over a 900° F temperature spread with either mercury or NAK is about the same as the movement provided by the previously used chlorinated diphenol obtained over about 460° F. Thus the lead of the threads on the inner shaft is designed to provide half of the axial movement of the inner shaft throughout its total rotation of 300 angular degrees. Stated another way, since the inner shaft must provide only half of the axial movement of the previous shaft used on non-heat-clean ovens, the lead of the inner shaft on the thermostat of this invention if half that of the previous shaft. So, correlating this with what is shown in FIG. 5, and in FIG. 2, when the temperature is set at 140° for a cooking mode of operation as shown in FIG. 5, the movable member serving as the fulcrum for the arm 20 is at its farthermost right position as seen in FIG. 2. By rotating the temperature setting dial 31 in a counterclockwise position through 300 angular degrees to arrive at the broil position, the movable member has moved to the left 0.023 inches. To move the movable member further to the left to reach the currently preferred heat cleaning temperature of 1,040° F requires further movement to the left of the movable member of 0.023 inches. This is accomplished by rotating the mode selector dial 42 from its FIG. 5 position to its FIG. 4 position.

The lead of the thread of the outer shaft must be about twice that of the lead of the thread of the inner shaft for the following reasons. If the dials are in the FIG. 5 position, rotating the mode selector dial also carries the inner shaft rotatably with it through engagement of the pin 40 against the finger 41 so that there is no relative rotation between the two shafts and the entire axial movement of 0.046 inches must be obtained entirely by the lead of the threads 38 of the outer shaft. If the temperature setting dial 31 is in its broil position before the mode selector dial is rotated from its FIG. 5 to its FIG. 4 position, the inner shaft, while not rotating in an absolute sense, is rotating relative to the outer shaft in the reverse direction so that there is a net gain in axial movement from the original position of the movable member of the inner shaft of only 0.023 inches from its initial location when the temperature setting dial was in the broil position. As a result, the lead of the outer shaft threads 38 may be the same as the lead of the shaft previously used in non-heat-clean ovens, while the lead of the threads 32 of the inner shaft must be half that of the lead of the single shaft of the previous standard thermostat.

Figure 6:
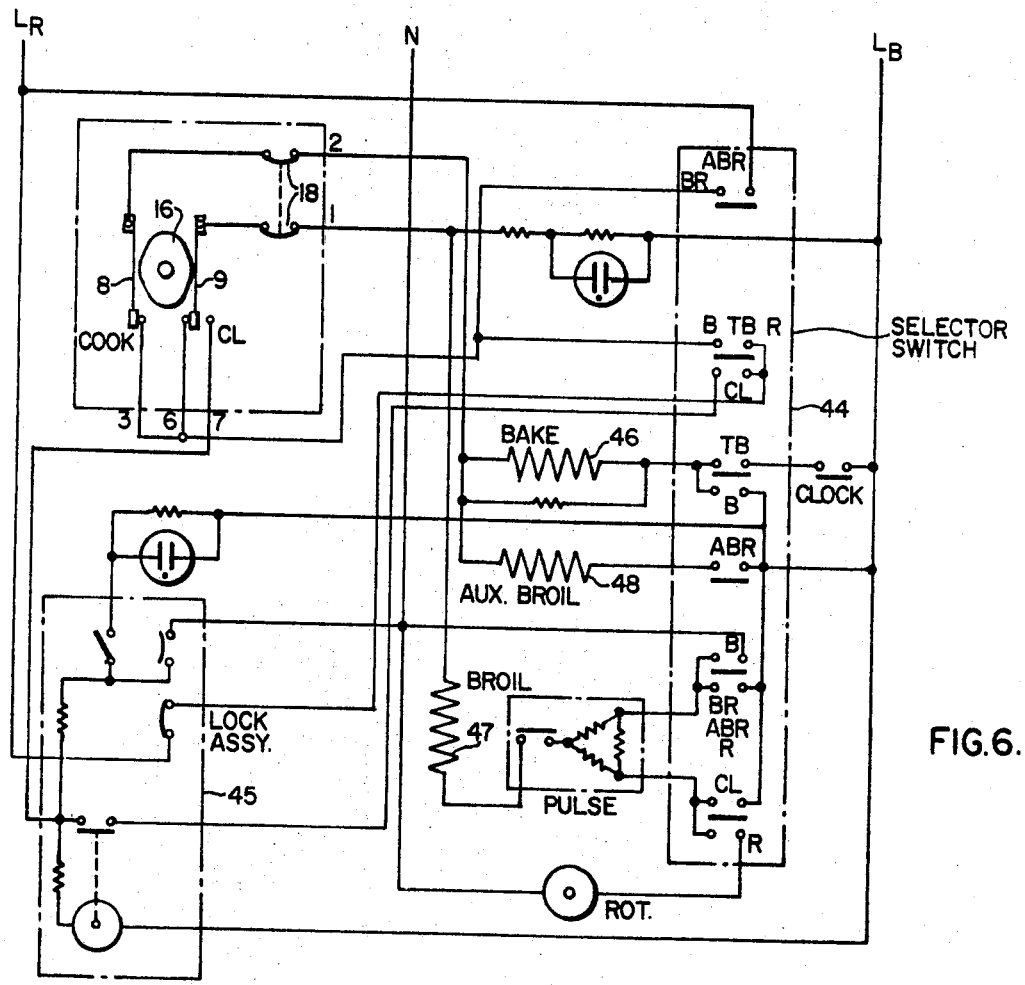
FIG. 6 is a schematic view of a circuit for an oven control system in which the thermostat according to the invention may be used.

Referring now to FIG. 6 the incorporation of the described thermostat in an oven control system in accordance with the invention and the circuit arrangement therefor is shown. The major components of the system in addition to the thermostat 10 includes the selector switch 44, a lock assembly 45 for the purpose of insuring that a cleaning operation cannot occur without the oven door being locked during the high temperature operation, the bake heating element 46, broil heating element 47 and optional auxiliary broil heating element 48, all the heating elements of course being located within the oven (not shown). For purposes of understanding the invention, it is considered unnecessary to detail the particular circuits which are energized in all the various cooking operations and the cleaning operation. However, for those who would desire to trace the circuitry, alphabetical indicia are located adjacent each of the contacts to indicate that in a particular cooking or cleaning operation the contacts are closed. These indicia and their meanings are as follows: B - Bake; TB - Time bake; BR - Broil; A BR - Auxiliary broil; R - Rotisserie; CL - Clean. For example, when the selector switch 44 is set to bake, and the mode selector dial 42 is set to the cook position, all of the contacts with the initial B will be in the closed position. With the selector switch 44 set to a cleaning position and the mode selector dial 42 also set to a cleaning position, those contacts carrying the legend CL will be closed.

It is noted that the cycling switch contacts 18, controlled in turn by the pressure wafer 27 responsive to oven temperatures, is connected directly in series with the heating elements in the oven for the various operations, and is in contrast to any arrangements in which the thermostat cycling switch controls a relay which in turn controls the energization of the heating elements. While the circuit connections in the bake, broil, and cleaning operations will not be traced as such it is noted that it may be derived from the schematic that in the bake operation, the bake element 46 is directly across the opposite sides of the usual three wire line, while the broil element 47 is between one side of the line and neutral. In the broil setting, the broil element 47 is directly across opposite sides of the line. In the cleaning operation, and in accordance with the preferred manner of a cleaning operation, the broil element 47 alone provides all the heat necessary for cleaning operation with the bake element being deenergized. It will be appreciated that other arrangements for purposes of providing heat during the cleaning operation may be provided by changing the circuit.

I claim as my invention:

1. In an oven thermostat of the type having a casing with a snap-acting, over-center mechanism therein for operating cycling switch contact means, and in which axial movement of positionable means controls the operating point of said over-center mechanism;

a user rotatable shaft arrangement for setting said positionable means for a range of oven temperatures for cooking operations, and a single high temperature for a heat cleaning operation, said shaft arrangement including;

inner and outer rotatable and axially movable concentric shafts, said inner shaft being threadably carried in said outer shaft and said outer shaft being threadably carried by said thermostat casing, said inner shaft being rotatable throughout the greater part of a full circle to move said positionable means to establish control temperatures in the range of cooking temperatures, said outer shaft being rotatable between opposite, angularly spaced, clean and cook positions to further move said positionable means, through the medium of said inner shaft, to establish a mode of oven operation, said outer shaft in its clean position locating said positionable means for attaining substantially maximum oven temperatures for heat cleaning operations; and means for operating a plurality of circuit completing switch means in accordance with rotation of said outer shaft, said outer shaft effecting closure of selected ones of said circuit completing switch means in said opposite positions, with all of said circuit completing switch means being open between the said opposite positions.

2. An oven thermostat according to claim 1 including:

means for rotating said inner shaft to a position of maximum cooking temperatures from any position corresponding to less than maximum cooking temperatures by rotation of said outer shaft to said clean position.

3. An oven thermostat according to claim 1 wherein:

said inner shaft has a thread lead to effect axial movement of said positionable means in accordance with rotation of said inner shaft for a distance corresponding to the cooking temperature range, and said outer shaft has a thread lead to effect the axial movement of said positionable means, through the medium of said inner shaft in accordance with rotation of said outer shaft, for a total distance encompassing all of said cooking temperature range plus an additional temperature increase to a temperature corresponding to the predetermined heat cleaning temperature.

4. An oven thermostat according to claim 1 including:

means for rotating said inner shaft from any rotated position other than a position corresponding to maximum cooking temperatures to said maximum cooking temperature position by operation of said outer shaft to said clean position.

5. An oven thermostat according to claim 5 including:

means for preventing rotation of said inner shaft when said outer shaft is in said cleaning position.

6. In an oven control system having a thermostat of the type in which power for oven heating means is directly interrupted by said thermostat through opening of snap-acting switch contact means in said thermostat upon the imposition of a force proportional to oven temperature upon an arm carrying said switch contact means, and having means for adjusting the opening temperature of said contact means through fulcrum means bearing upon said arm, wherein the improvement comprises a shaft arrangement for positioning said fulcrum to provide for both adjustable cooking operation control and heat cleaning operation control, said shaft arrangement including:

first rotatable shaft means axially movable in accordance with its rotation for positioning said fulcrum;

second rotatable shaft means axially movable in accordance with rotation of said second shaft means for further positioning said fulcrum;

said first and second shafts being in concentric relation, with said first shaft being threadably carried in said second shaft;

means for rotating said second shaft between a cooking operation position and an opposite cleaning operation position;

means for rotating said first shaft between opposite positions for setting the cooking temperature when said second shaft is in said cooking operation position; and means holding said first shaft against rotation when said second shaft is in said cleaning operation position.

7. In an oven control system according to claim 7 wherein:

said first shaft occupies a rotated position corresponding to a substantially maximum temperature for cooking when said second shaft occupies said cleaning operation position.

8. In an oven control system according to claim 8 including:

means for rotating said first shaft from any rotated position other than said substantially maximum cooking temperature position, to said substantially maximum cooking temperature position, with said second shaft when said second shaft is rotated to said cleaning operation position.

9. In an oven control system according to claim 7 wherein:

the lead of the threads for said first shaft for maximum rotation is about half the lead of the threads of the second shaft for maximum rotation.

* * * * *